(12) United States Patent
Koenck et al.

(10) Patent No.: US 8,446,503 B1
(45) Date of Patent: May 21, 2013

(54) IMAGING SYSTEM

(75) Inventors: Steven E. Koenck, Cedar Rapids, IA (US); David W. Jensen, Marion, IA (US); Cees Draijer, Waterloo, CA (US)

(73) Assignees: Rockwell Collins, Inc., Cedar Rapids, IA (US); Teledyne Dalsa, Inc., Cedar Rapids, IA (US)

( * ) Notice: Subject to any disclaimer, the term of this patent is extended or adjusted under 35 U.S.C. 154(b) by 657 days.

(21) Appl. No.: 12/570,528

(22) Filed: Sep. 30, 2009

Related U.S. Application Data

(63) Continuation-in-part of application No. 11/805,510, filed on May 22, 2007, now abandoned.

(51) Int. Cl.
*H04N 3/14* (2006.01)
*H04N 5/335* (2006.01)

(52) U.S. Cl.
USPC .......................................................... 348/297

(58) Field of Classification Search
None
See application file for complete search history.

(56) References Cited

U.S. PATENT DOCUMENTS

| | | | |
|---|---|---|---|
| 2005/0281332 A1* | 12/2005 | Lai et al. .................. | 375/240.03 |
| 2008/0137978 A1* | 6/2008 | Fu .................. | 382/255 |
| 2008/0219585 A1* | 9/2008 | Kasai et al. .................. | 382/274 |
| 2008/0231718 A1* | 9/2008 | Garg et al. .................. | 348/222.1 |
| 2008/0246873 A1* | 10/2008 | Kinoshita .................. | 348/340 |
| 2008/0284872 A1* | 11/2008 | Asoma .................. | 348/229.1 |
| 2010/0019128 A1* | 1/2010 | Itzler .................. | 250/208.1 |

OTHER PUBLICATIONS

Dictionary Definition of Algorithm, Merriam Webster Online Dictionary, Printed Oct. 6, 2012.*

* cited by examiner

*Primary Examiner* — Sinh Tran
*Assistant Examiner* — Jason Flohre
(74) *Attorney, Agent, or Firm* — Donna P. Suchy; Daniel M. Barbieri

(57) ABSTRACT

An imaging system may include: at least one photon sensing pixel; at least one digital counting circuit; and at least one processing core programmed to apply at least one image processing algorithm to at least one pixel sample of the at least one digital counting circuit.

18 Claims, 10 Drawing Sheets

IMAGING SYSTEM

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, or for any and all parent, grandparent, great-grandparent, etc. applications of the Related Application(s)).

RELATED APPLICATIONS

The present application constitutes a continuation-in-part of U.S. patent application Ser. No. 11/805,510 filed May 22, 2007 now abandoned on behalf of Koenck et al. entitled "Energy Efficient Processing Device" which is currently co-pending, or is an application of which a currently co-pending application is entitled to the benefit of the filing date.

All subject matter of the Related Applications and of any and all parent, grandparent, great-grandparent, etc. applications of the Related Applications is incorporated herein by reference to the extent such subject matter is not incon-sistent herewith.

BACKGROUND

Night vision technology has enabled a wide variety of military missions to be executed effectively in light conditions as low as overcast starlight. Digitally enhanced vision technology has the potential to further increase this tactical advantage. The image intensifier tubes used in present direct-view night vision goggles achieve good low light sensitivity, but are physically large and have limitations in image quality, dynamic range, and suitability for system integration that may be overcome with digital technology.

A solid-state digital image sensor with sensitivity for night vision operation may have a dramatic impact on the availability and effectiveness of a next-generation night vision system. High performance uncooled solid-state low light image sensing has been an elusive goal for years.

It is generally recognized that low light image sensing is greatly affected by noise. The reason for this is that in the lowest light conditions contemplated for night vision applications such as overcast starlight, the number of discrete photons arriving at each pixel in a video image sensor during the frame integration time may be very low—on the order of 3-5. With such a small signal, even a very low noise floor will represent a significant portion of the output of the image sensor. For this reason, it is common to cool low light sensors to reduce the magnitude of thermal noise, which is proportional to temperature. While cooling may be an effective way to improve sensor performance, it requires a significant amount of power that makes operation from batteries difficult.

Low light image sensors using avalanche photodiodes coupled with an analog comparator may be used to detect individual photons in the visible to near infra-red spectrum. The avalanche photodiode is biased to operate in a linear gain mode. When a photon arrives, a photo-electron may be generated. The photo-electron is directed by a bias voltage toward the avalanche photodiode junction, where it is accelerated by the high static electric field in the junction. The high velocity electron collides with atoms in the junction region, causing impact ionization action that generates a burst of approximately 100-200 additional electrons. This burst of electrons is accumulated in the capacitive charge storage of a signal node and is detected by an analog comparator, whose output is coupled to a digital counter circuit. Each pixel in the image sensor may be provided with a comparator and counter, which serves the dual functions of effective analog to digital conversion and signal integration.

Even with the electron gain provided by the avalanche photodiode, the signal associated with a burst of 100-200 electrons is quite small. It is quite likely that noise present in the system will cause counts to appear when no photon has arrived, or conversely, to fail to cause a count when a photon has arrived. In either case, the quality of the image will be degraded. What is needed is a method to restore the reduced quality of the images captured by an extremely sensitive but relatively noisy image sensor to generate a high quality images.

SUMMARY OF THE INVENTION

The present invention incorporates the uncooled solid-state low light image sensor described above combined with image processing algorithms to generate high quality images. The image processing algorithms may require significant computing capacity to be executed at a rate sufficient for video imaging purposes. An energy efficient, high performance microcoded multicore microprocessor architecture is disclosed that is capable of performing the necessary image processing functions at the required rates while consuming sufficiently low energy to be powered by batteries.

DETAILED DESCRIPTION

Figure 1:
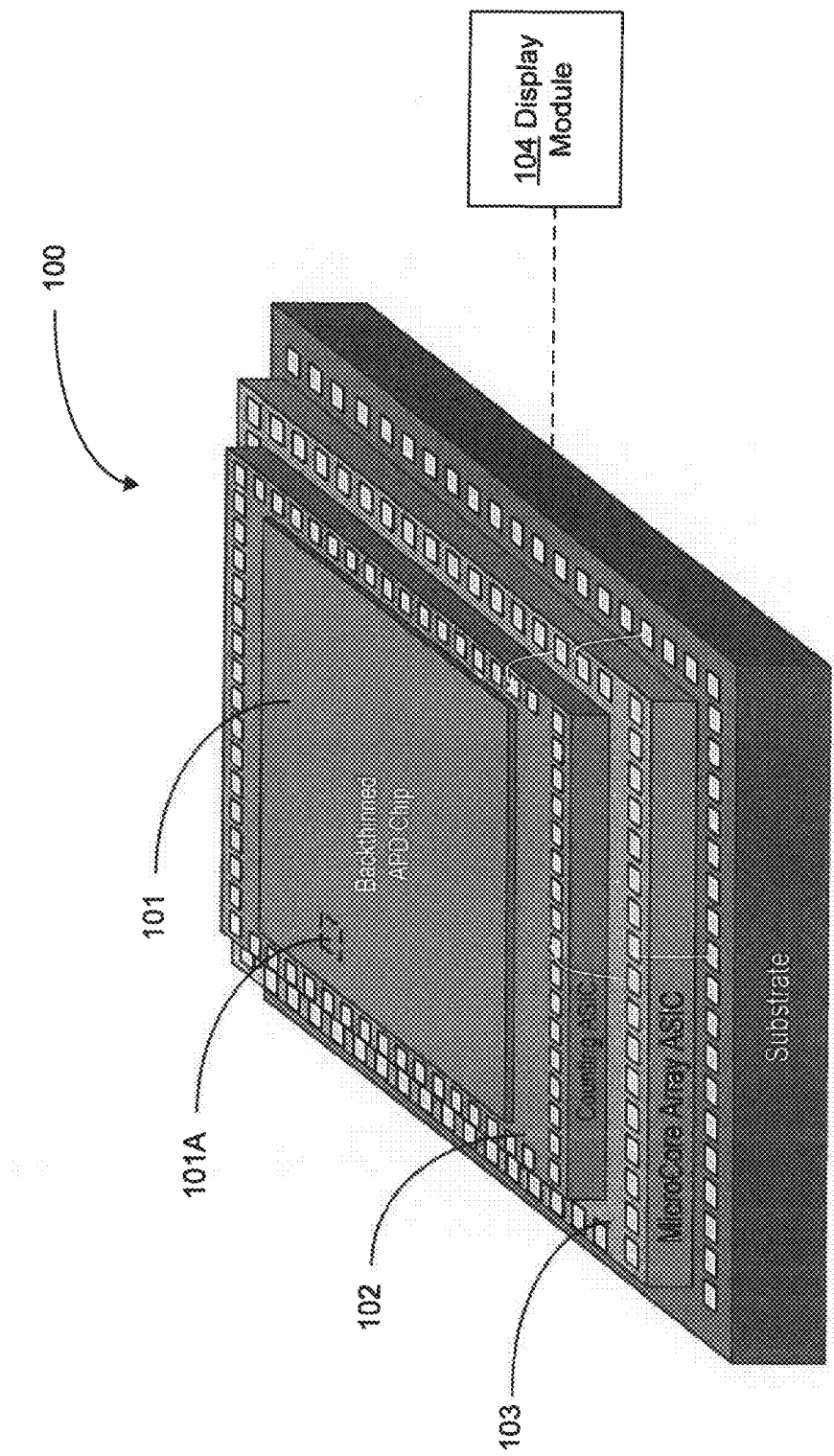
FIG. 1 illustrates an exemplary packaging and interconnection method that may be used to physically and electrically construct the imaging system.

Referring to FIG. 1, a sensor system 100 for high-quality imaging is illustrated. In an exemplary embodiment, the sensor 100 system is comprised of stacked integrated circuits. The system 100 includes an energy efficient parallel multi-core image processor 103 to provide the necessary image enhancement processing. Preferably, the image processor may be comprised of multiple instances of an energy efficient microcoded processor as described more fully in U.S. patent application Ser. No. 11/805,510 filed May 5, 2007 by Koenck et al. entitled "Energy Efficient Processing Device" and assigned to the assignee of the present application, the disclosure of which is hereby incorporated herein by reference in its entirety. Various algorithms may be executed on the parallel multicore image processor to exploit the strengths of these elements and compensate for individual weaknesses to provide enhanced vision capability.

Figure 2:
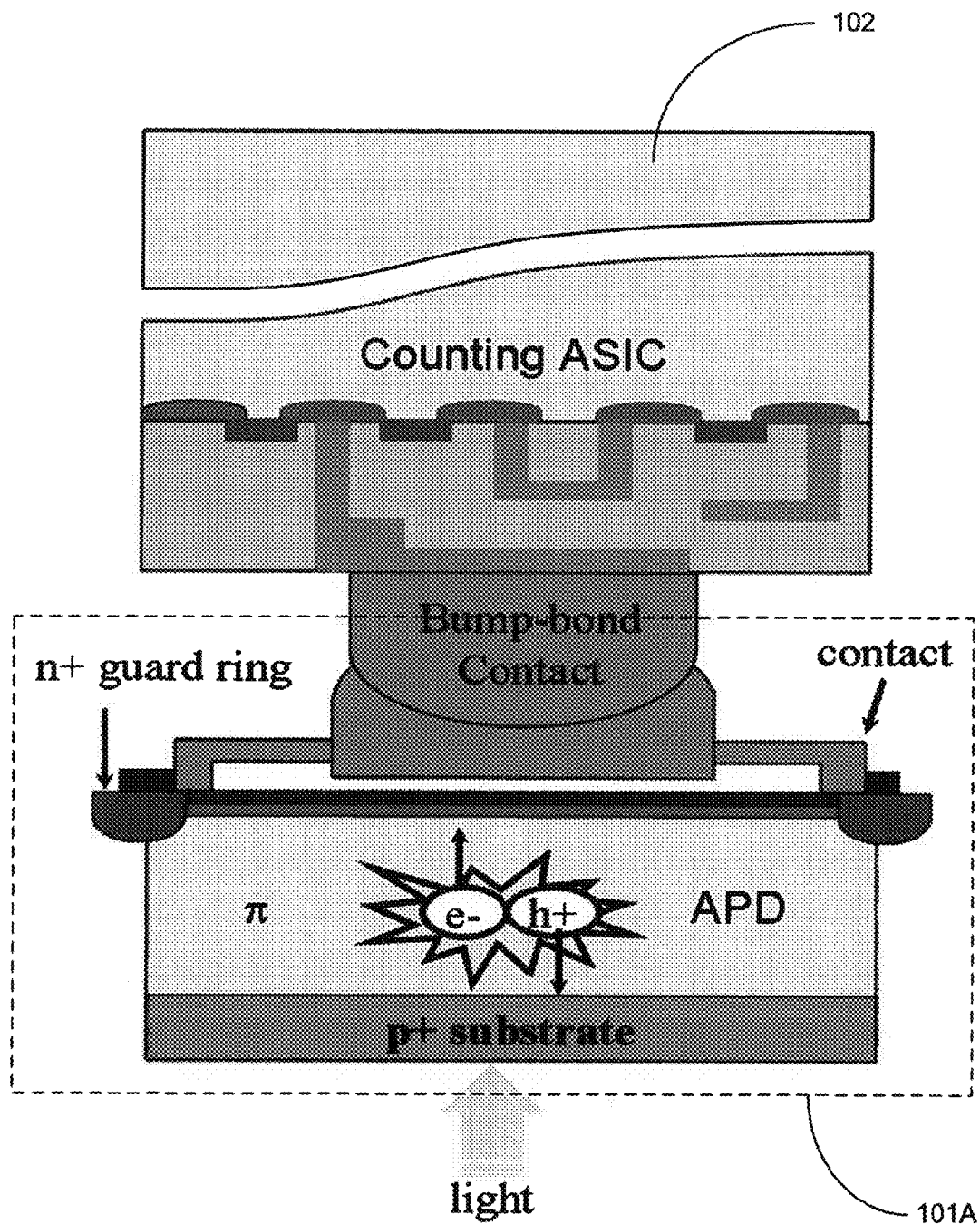
FIG. 2 is a somewhat schematic cross-section representation of the avalanche photodiode pixel.

Referring to FIGS. 1-2, a solid-state uncooled low light image sensor 101 utilizing thresholded avalanche photodiode (APD) pixels 101A is illustrated. The APD sensor 101 may be a two-chip hybrid comprised of a backside thinned APD pixel 101A array bump bonded to a CMOS integrated circuit as illustrated in FIG. 2. The APD sensor 101 may be biased to operate with a gain of about 100-200. Incident photons with wavelengths between 200-1000 nm create a "burst" of electrons that may be detected by an analog comparator connected to a digital counting ASIC 102 as illustrated in FIG. 2. The digital counting ASIC 102 provides a digital counter for each APD pixel 101A to serve the dual purposes of analog to digital conversion and integration of a received signal over time.

Figure 3:
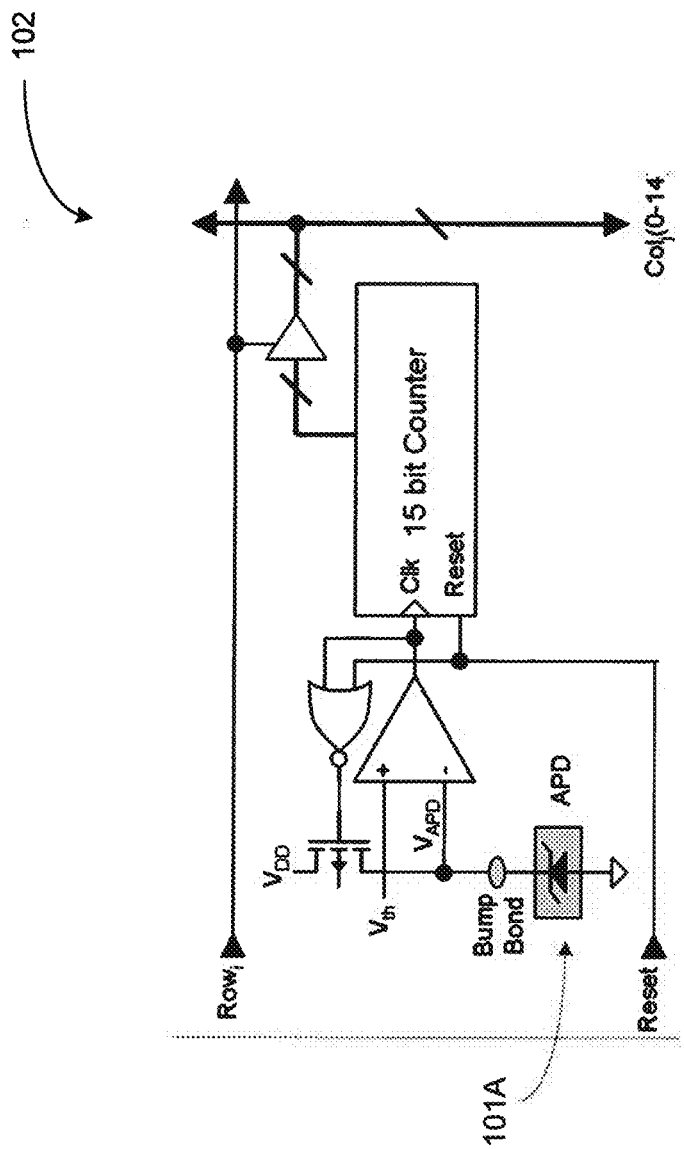
FIG. 3 is a schematic representation of the electrical circuitry used to interface to the avalanche photodiode detector.

Referring to FIG. 3, a schematic diagram of the digital counting circuit 102 is illustrated. Each pixel 101A of the ADP sensor 101 is connected to a dedicated counting circuit 102. The APD sensor 101 may exhibit a number of potential image quality degrading characteristics such as non-uniformity, mode discontinuity, and noise. As such, "fine grain" mode control and enhancement of the output signals generated by each pixel may be managed by a processor.

Figure 4:
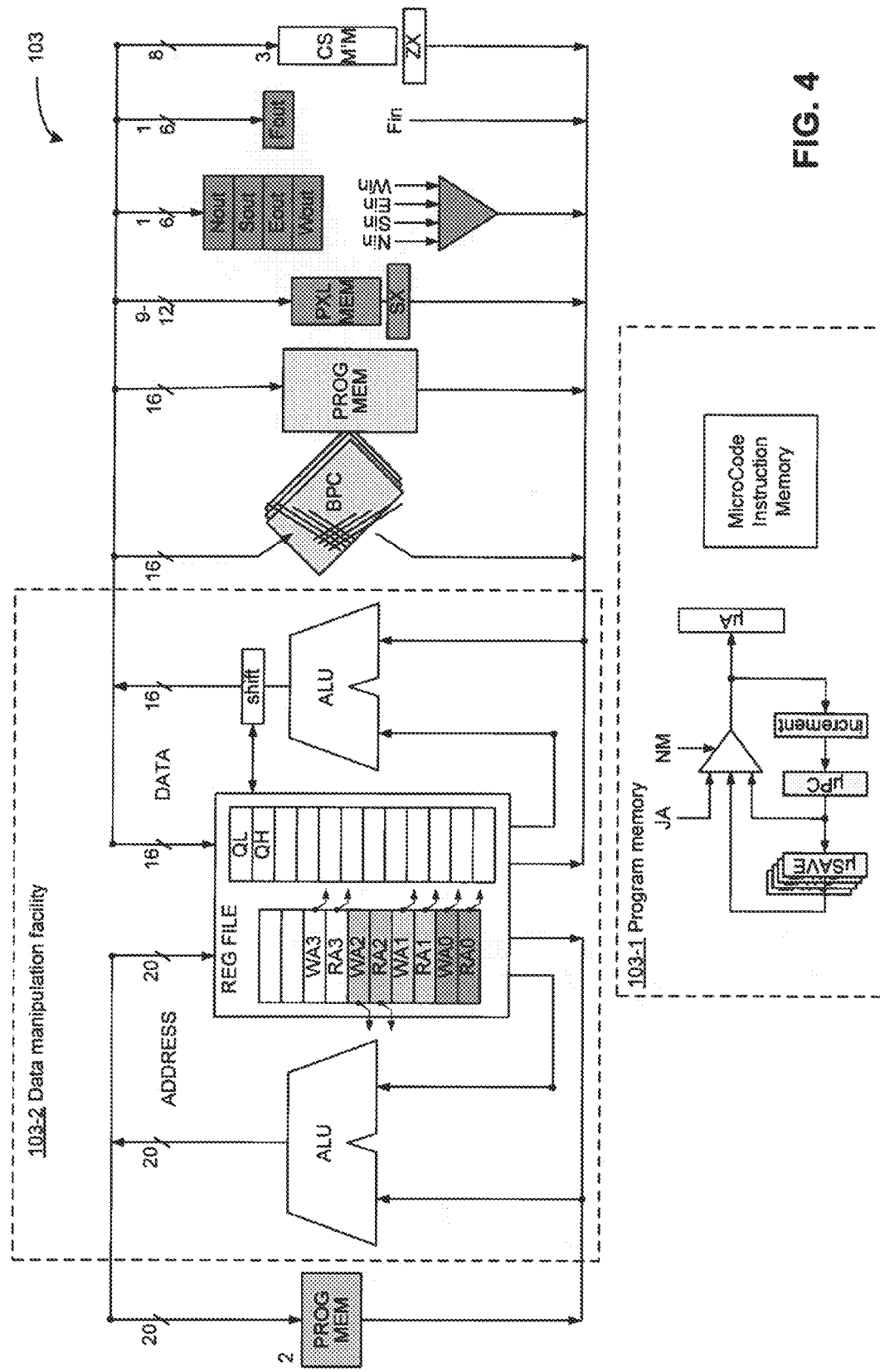
FIG. 4 is a general block diagram and summary description of the MicroCore processor.

Referring to FIG. 4, an architecture block diagram for a processor 103 optimized for image processing is illustrated. The processor 103 includes a stored program maintained in a very long instruction word (VLIW) microcoded program memory 103-1, and data manipulation facility 103-2 comprised of a register file and an arithmetic logic unit (ALU). With these two blocks, the processor 103 executes instructions, performs program control flow including conditional tests, branches, and subroutine linkage, and performs Boolean and arithmetic functions in a very small physical and power footprint.

Figure 5:
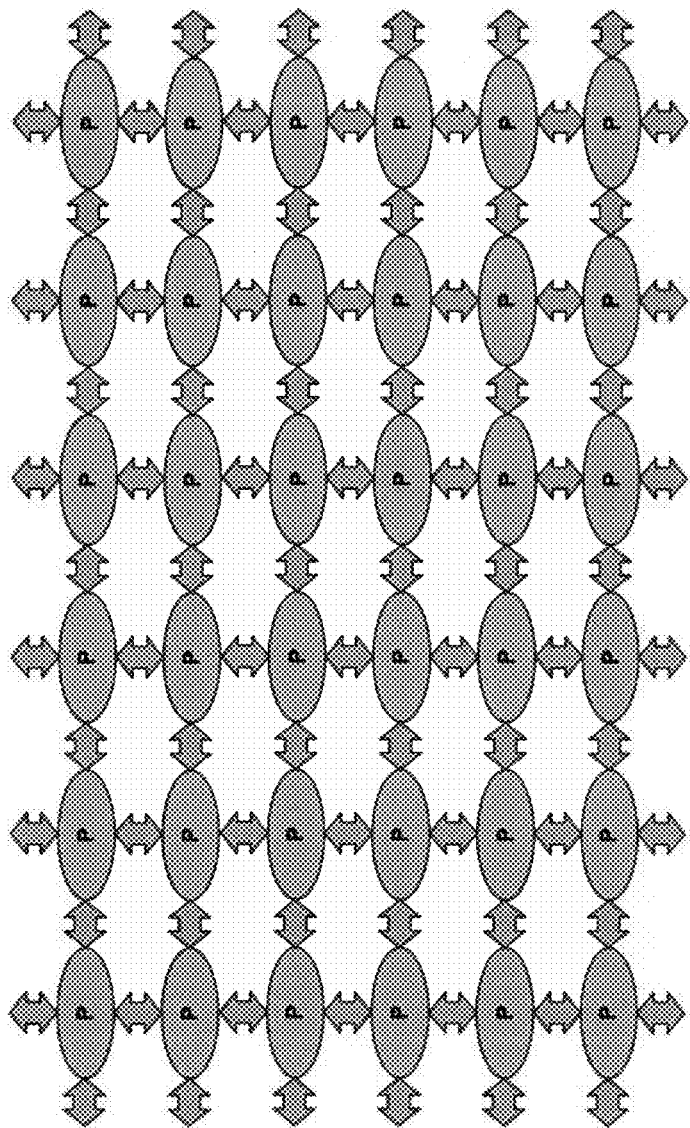
FIG. 5 is an illustration of the interconnection structure of the multiple MicroCore computing array.

A multicore processing architecture may be configured to provide a high performance computing system. Using the very small, energy efficient processors 103 interconnected together into a multicore processing array (as shown in FIG. 5), it is possible to create a high performance parallel image processing system that is capable of being powered by batteries.

Multiple parallel processors 103 may be allocated to the image processing problem based on pixel blocks. In an exemplary embodiment, blocks of 128×128 sensor pixels 101A of sensor 101 may be associated with each MicroCore processor, and an array of 13×10 of such MicroCore processors 103 may be configured to provide image processing for an image sensing array of 1600×1200 pixels. The total power consumption of each processor 103 may be approximately 5 mW, resulting in a total power consumption of approximately 650 mW for a 13×10 array of processors 103.

Standard image processing algorithms such as noise reduction, gamma correction, non-uniformity correction, and bad pixel replacement may be utilized to substantially improve the effective quality of the imaging system 100. Such algorithms may utilize only a small percentage of the total computing capacity of a high performance multicore processor. The remaining capacity may be applied to much more computationally complex algorithms.

For example, high dynamic range and deblurring algorithms may be applied to images to derive more effective light sensitivity from existing low light sensors.

The human eye is capable of sensing luminance spanning approximately nine orders of magnitude, from bright sunlight to starlight, with approximately four orders of magnitude of dynamic range within a single scene. A typical 12-bit CMOS sensor is capable of about three and a half orders of magnitude. After sensing and processing, an image displayed on a screen may only account for about two and a half orders of magnitude of variation.

The ability to sense a wider single-scene dynamic range may provide a significant situation awareness advantage. For example, a user in an urban environment may encounter bright street lights and dark alleys in a single scene, with activity of interest occurring in either place. Similarly, a user surveying a cave entrance in daylight conditions may be unable to sense activity inside the cave.

Figure 6A:
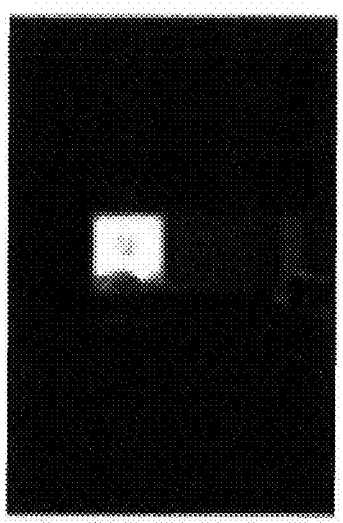
FIGS. 6A and 6B are photographs of an interior scene under different exposure conditions.
Figure 6B:
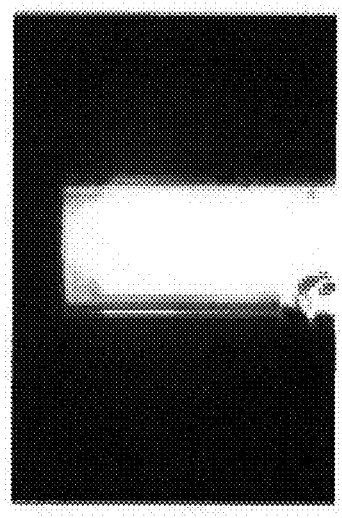

The addition of computing power enables enhanced algorithms to combine multiple images into a superior fused scene. By way of example, FIGS. 6A and 6B, show two images of the same scene with varying exposures. FIG. 6A depicts the scene with a relatively low total exposure, in which a brightly illuminated far room is visible, while the room the user is in is underexposed. By contrast, FIG. 6B depicts the scene with a relatively high total exposure, in which the brightly illuminated far room is overexposed, while the doorway is visible.

Figure 7:
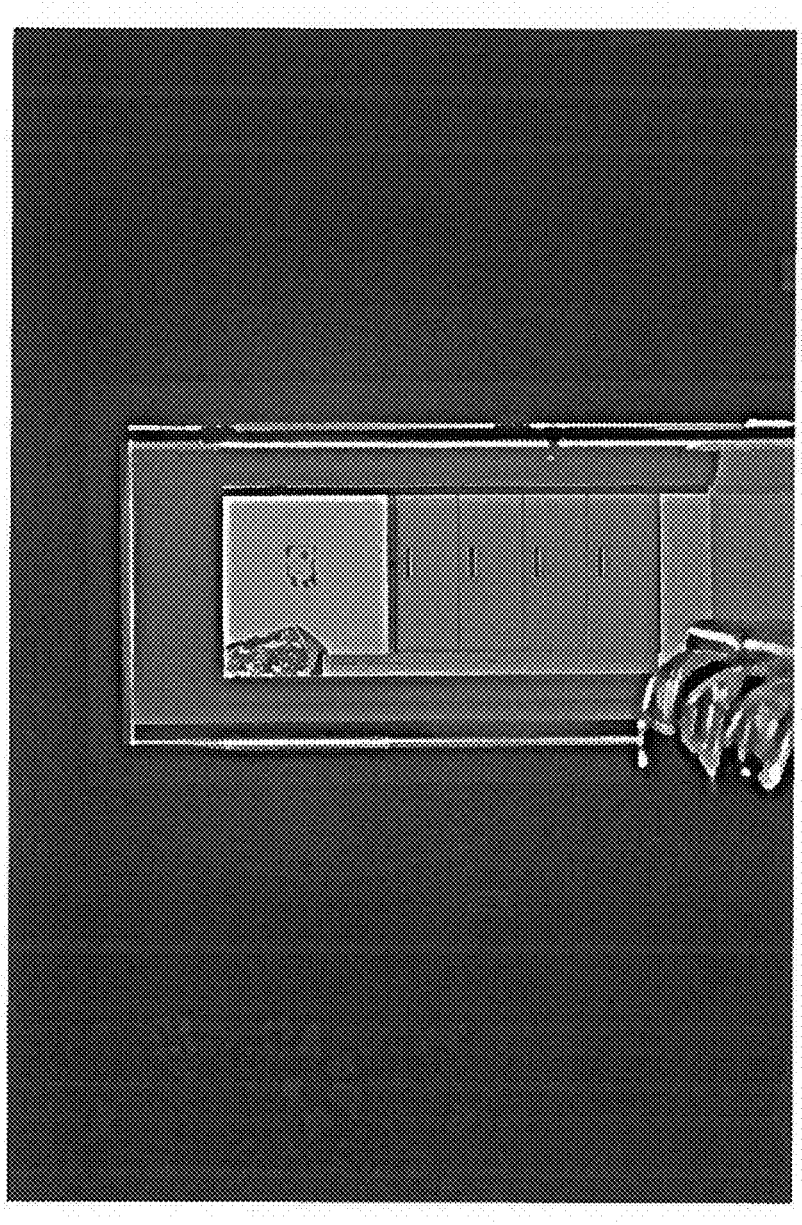
FIG. 7 is a processed image generated from the photographs of FIGS. 6A and 6B.

The two images of the same scene may be processed and combined into a single image to provide higher single-scene dynamic range than either single image provides. The process for this high dynamic range image generation involves aligning the two images such that each pixel position in the images corresponds to exactly the same location in the scene, examining the value of the the pixel samples to determine if the sample is saturated (at or near the maximum full-scale range of the pixel value) or cutoff (at or near the minimum range of the pixel; typically 0), selecting a pixel sample from one of the two images that is numerically farthest from the saturation or cutoff condition, and proportionally scaling the sample values based on the relationship of the relative exposures of the images. For example, if the overexposed image is exposed exactly four times longer than the underexposed image, the sample values of the underexposed image should be mathematically multiplied by four so that the absolute value of all of the samples represent the same amount of light. The result of this process is a single image file with two more bits of resolution per sample than either of the original image files. The combined scene may be presented to the user (e.g. via at least one display module 104 such as an LCD monitor integrated into a night vision goggle system, a heads-up display, and the like), as seen in FIG. 7, which allows the user to recognize features of the scene in all three rooms despite the varying illumination. The processed image reveals details that are not visible in any of the raw images before processing. By reducing the variation in brightness while preserving local detail, substantial improvements in operational effectiveness may be achieved by the user.

Additionally, the use of longer exposure times for sensors would allow the integration of more photons, which would provide an effective increase in sensitivity. Unfortunately excessively long exposure time may introduce camera motion and the resulting blurring may degrade image quality.

Figure 8:
FIG. 8 contains a series of photographs of a darkened alley scene, each with varying degrees of motion blur.
Figure 9:
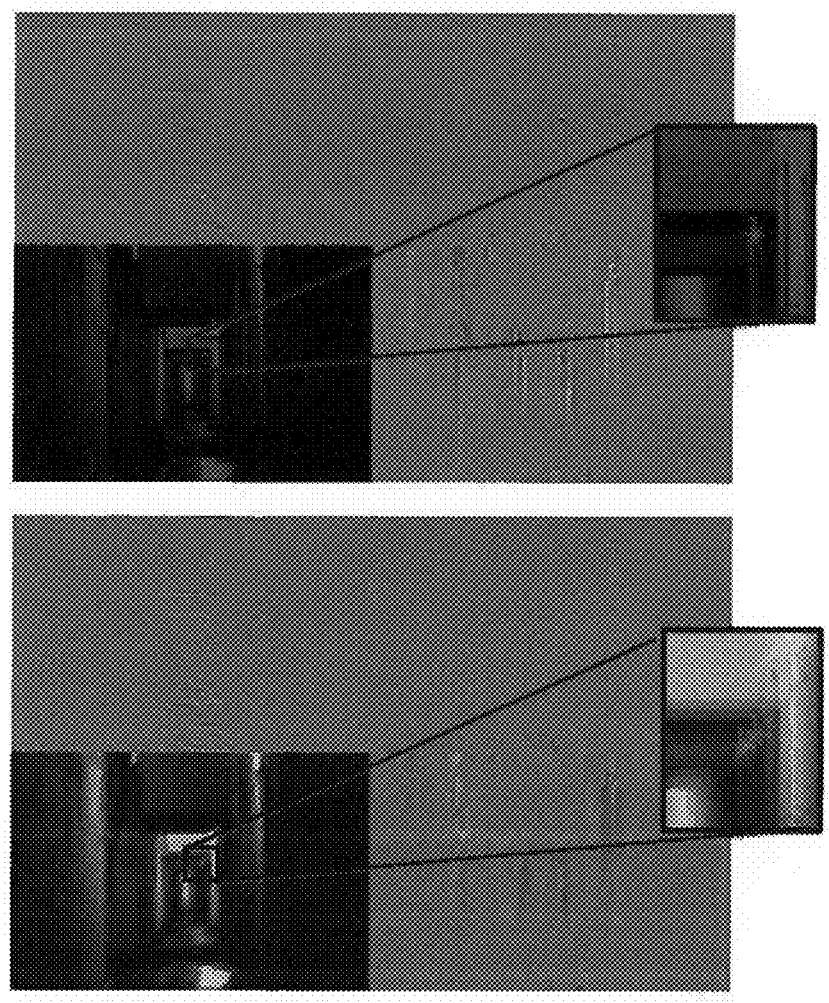
FIG. 9 is a visualization and illustration of an improvement in image blur quality in the image of FIG. 8.

A fast motion deblurring algorithm using a discrete wavelet transform (DWT) may be employed to counteract such effects. FIG. 8 shows a series of dark alley scenes where increasing exposure time creates blurring. A DWT software framework can provide real time performance using multiple resolution levels for analysis. FIG. 9 shows a visual depiction of the DWT format, and shows a magnified view of a blurred artifact in two images. The deblurring process searches for motion between low resolution representations of two frames and refines the motion estimate using high resolution representations. This deblurring should visually improve an image. Searching on the low resolution resolution and refining with the high resolution significantly reduces the processing time.

Figure 10:
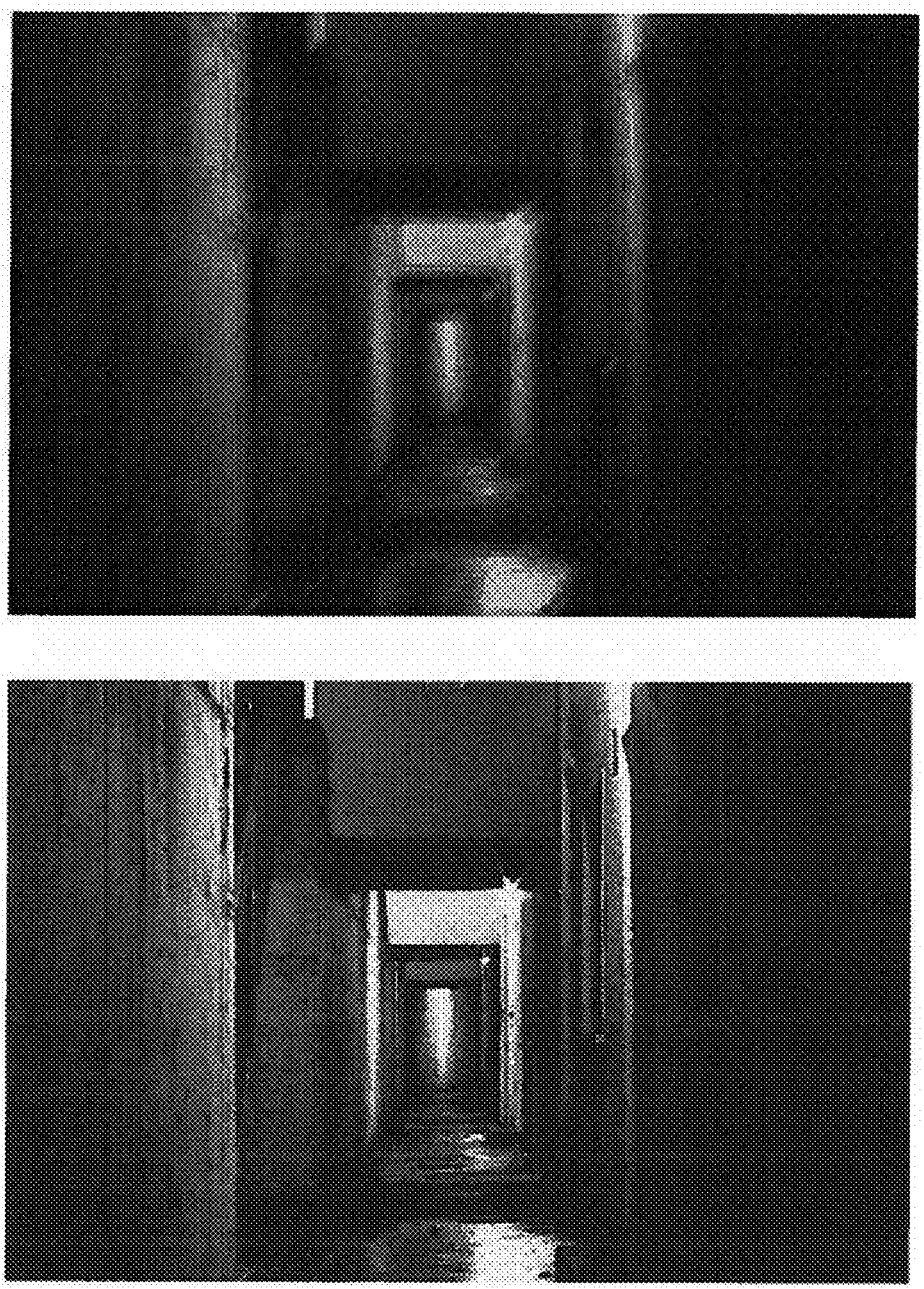
FIG. 10 illustrates the difference in the quality of a darkened alley scene with motion blur and with the motion blur reduced by the processing of the present invention.

The deblurring portion of the algorithm uses a motion vector as a seed for a Point Spread Function (PSF) and performs an iterative refinement of the blurred image. Estimated motion vectors from the DWT search, from previous estimates, or random vectors can be used as the seed for the refinement process. The final deblurred image is selected using signal to noise analysis of the resulting images. The result of this process is illustrated in FIG. 10 showing the removal of blurriness and the increased dynamic range To avoid the introduction of a full frame of latency, multiple frames may be captured and processed and the computed improvements may be applied to a current frame representation. This approach can reduce the latency to less than a frame time with minimal introduction of noise and artifacts.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. An imaging system comprising:
    at least one photon sensing pixel;
    at least one digital counting circuit; and
    at least one processing core programmed for applying at least one image processing algorithm to at least one pixel sample of the at least one digital counting circuit, wherein the applying at least one image processing algorithm to at least one pixel sample of the at least one digital counting circuit includes:
        receiving a low-exposure pixel sample associated with a first point-in-time view;
        receiving a high-exposure pixel sample associated with a second point-in-time view;
        computing a difference between the low-exposure pixel sample and a minimum cutoff value;
        computing a difference between the high-exposure pixel sample and a maximum saturation value; and
        selecting a pixel sample having a greater difference as a representative pixel sample.

2. The imaging system of claim 1, wherein the at least one photon sensing pixel comprises:
    at least one uncooled solid-state photon counting pixel.

3. The imaging system of claim 1, wherein the applying at least one image processing algorithm to at least one pixel sample of the at least one digital counting circuit further comprises:
    applying a noise reduction algorithm to at least one pixel sample of the at least one digital counting circuit.

4. The imaging system of claim 1, the at least one processing core further programmed for:
    scaling the first low-exposure pixel sample by a factor corresponding to the ratio of a high-exposure pixel sample exposure time to a low-exposure pixel sample exposure time.

5. The imaging system of claim 1, wherein the applying at least one image processing algorithm to at least one pixel sample of the at least one digital counting circuit further comprises:
    applying a deblurring algorithm to at least one pixel sample of the at least one digital counting circuit.

6. The imaging system of claim 5, wherein the applying a deblurring algorithm to at least one pixel sample of the at least one digital counting circuit further comprises:
    applying iterative deblurring using refinement of a Point Spread Function (PSF) derived from an initial motion vector seed.

7. The imaging system of claim 6, wherein the applying iterative deblurring comprises:
    applying a fast searching algorithm using a multiple resolution representation of an image to derive a motion vector; and
    refining a blurred image using an iterative or direct method with the motion vector.

8. The imaging system of claim 1, wherein the at least one photon sensing pixel comprises:
    at least one uncooled avalanche photodiode sensor.

9. The imaging system of claim 1, wherein the at least one photon sensing pixel and the at least one digital counting circuit are operably coupled by a bump bond contact.

10. The imaging system of claim 1, wherein the at least one photon sensing pixel, the at least one digital counting circuit, and the at least one processing core are in a stacked configuration.

11. The imaging system of claim 1, wherein the at least one processing core comprises:
    a plurality of processing cores forming a multicore parallel processing array.

12. The imaging system of claim 1, further comprising:
    a display module.

13. A method for capturing images comprising:
    counting at least one detected photon;
    digitally sampling a count of detected photons;
    applying at least one image processing algorithm to at least one pixel sample of the at least one digital counting circuit, wherein the applying at least one image processing algorithm to at least one pixel sample of the at least one digital counting circuit includes:
        receiving a low-exposure pixel sample associated with a first point-in-time view;
        receiving a high-exposure pixel sample associated with a second point-in-time view;
        computing a difference between the low-exposure pixel sample and a minimum cutoff value;
        computing a difference between the high-exposure pixel sample and a maximum saturation value; and
        selecting a pixel sample having a greater difference as a representative pixel sample.

14. The method of claim 13, wherein the applying at least one image processing algorithm to at least one pixel sample of the at least one digital counting circuit further comprises:
    applying a noise reduction algorithm to at least one pixel sample of the at least one digital counting circuit.

15. The method of claim 13, wherein the applying at least one image processing algorithm to at least one pixel sample of the at least one digital counting circuit further comprises:
    applying a deblurring algorithm to at least one pixel sample of the at least one digital counting circuit.

16. The method of claim 15, wherein the applying a deblurring algorithm to at least one pixel sample of the at least one digital counting circuit further comprises:

applying iterative deblurring using refinement of a Point Spread Function (PSF) derived from an initial motion vector seed.

17. The method of claim 16, wherein the applying iterative deblurring comprises:
   applying a fast searching algorithm using a multiple resolution representation of an image to derive a motion vector; and
   refining a blurred image using an iterative or direct method with the motion vector.

18. A system for image processing comprising:
   means for counting at least one detected photon;
   means for digitally sampling a count of detected photons;
   means for applying at least one image processing algorithm to at least one pixel sample of the at least one digital counting circuit, wherein the applying at least one image processing algorithm to at least one pixel sample of the at least one digital counting circuit includes:
      receiving a low-exposure pixel sample associated with a first point-in-time view;
      receiving a high-exposure pixel sample associated with a second point-in-time view;
      computing a difference between the low-exposure pixel sample and a minimum cutoff value;
      computing a difference between the high-exposure pixel sample and a maximum saturation value; and
   selecting a pixel sample having a greater difference as a representative pixel sample.

* * * * *